June 12, 1973 R. VON SIEMENS 3,738,879

METHOD OF PRODUCING AN EXACT EDGE ON AN ETCHED ARTICLE

Filed March 10, 1971

INVENTOR

Ruprecht von Siemens

BY

Hill, Sherman, Meroni, Gross & Simpson

ATTYS.

United States Patent Office 3,738,879

Patented June 12, 1973

3,738,879

METHOD OF PRODUCING AN EXACT EDGE ON AN ETCHED ARTICLE

Ruprecht von Siemens, Munich, Germany, assignor to Siemens Aktiengesellschaft

Filed Mar. 10, 1971, Ser. No. 122,797
Claims priority, application Germany, Mar. 19, 1970, P 20 13 196.8
Int. Cl. C23f *1/02;* H05k *1/00, 3/04*
U.S. Cl. 156—11 7 Claims

ABSTRACT OF THE DISCLOSURE

An edge more exactly conforming to the outlines of an etching mask is produced by a method which includes providing a metallic foil whose resistance to etching decreases along the depth of its thickness from at least a first surface, applying an etching mask to at least said first surface of the foil, and subjecting the masked surface to an etching agent. The differential resistance to etching avoids or minimizes undercutting of the edges of the thick foil. The foil may be acted on by the etching agent from one or more surfaces and in each case should decrease in resistance from the surface being acted on. The foil may comprise a series of discrete layers having predetermined thickness relationships with each other. To provide a continuous change of resistance to the etching agent which is inversely proportional to the distance from the unmasked surface, the discrete layers of material having different resistance values may be subjected to a high temperature diffusion treatment whereby their change in resistance follows a smooth curve.

BACKGROUND OF THE INVENTION

This invention generally relates to the production of formed articles through etching and more particularly concerns a method of producing etched articles made of relatively thick metal foils so that the edges produced by the etching exactly correspond to an overlying etching mask.

In the process wherein a relatively thick metal foil is provided with an etching mask such as a photosensitive lacquer in the areas where the foil is to remain and the thus treated foil is subjected to an etching agent, I discovered that in foils having uniform resistance to the etching agent throughout their thickness, the areas immediately below the edges of the masking material were taken out more quickly so that undercutting occurred. This undercutting resulted in a fuzzy edge that did not entirely coincide with the outlines of the etching mask. Previously a number of thin etched metal foils had to be effectively stacked one upon another to produce a sharp exact edge. This led to a great number of layers being applied at accordingly greater expense. In order to get along with a small number of layers it followed that thicker foils had to be applied, however, these thicker foils were subject to the previously mentioned difficulties.

SUMMARY OF THE INVENTION

It is an object of the present invention to overcome the disadvantages present in the prior art by providing a method of etching relatively thick metal foils so that an exact, relatively vertical edge is produced.

According to the invention herein the method of producing exact edge configurations in metallic foil through etching includes providing a metallic foil whose resistance to etching decreases along the depth of its thickness from at least a first of its largest surfaces, applying an etching mask to at least said first surface of said foil, and subjecting said masked surface to an etching agent. The resistance of the metallic foil to etching may decrease incrementally wherein the metallic foil consists of several discrete layers of material having different etching characteristics.

In one embodiment the metal foil has an inner core layer having a first resistance to etching and additional layers of metal on each surface of the core with each of the additional layers having a second resistance to etching. The first resistance to etching is less than the second resistance so that the core will be etched faster than the outerlying additional layers. Further layers may be arranged between the core and the additional layers with the further layers having a resistance to etching which is intermediate the first and second resistances. The thicknesses of the individual core, additional and further layers may differ from one another by not more than a factor of five, i.e. one is not more than five times as thick as the other. I have found is advantageous to make the core about twice as thick as each of the additional layers.

Optimum results are achieved when the decrease in etching resistance of the metal foil along its thickness is inversely proportional to the effect of the etching agent on the metal so that the etching will produce a straight vertical edge that is as close to perpendicular with the surface of the foil as is possible. A smooth transition of the etching resistances which vary with their distance from the surface is achieved by providing a series of discrete layers of metal and then subjecting this plurality of layers to a high temperature diffusion so that the variances between the resistance of each of the individual layers is reduced. I have found that accelerating the effect of the etching agent in the unmasked areas also minimizes the undercutting that has resulted according to the prior art. Such acceleration may be produced by charging the metal foil with a direct current so that it acts as a cathode. Also the etching agent may be applied as a spray against the metal foil. I have also found that the different resistances to etching and the different layers of foil are caused or strengthened by a local cell formation and accordingly this also is helpful.

Application of the method herein results in a higher etching speed occurring in the direction vertical to the foil surface then occurs in the direction horizontal to the foil surface. This means that the undercutting of the etching mask is decreased with respect to the prior art methods.

BRIEF DESCRIPTION OF THE DRAWINGS

Other objects, features and advantages of the invention will be readily apparent from the following description of certain preferred embodiments thereof, taken in conjunction with the accompanying drawing, although variations and modifications may be effected without departing from the spirit and scope of the novel concepts of the disclosure, and in which.

DESCRIPTION OF THE PREFERRED EMBODIMENTS

Figure 1:
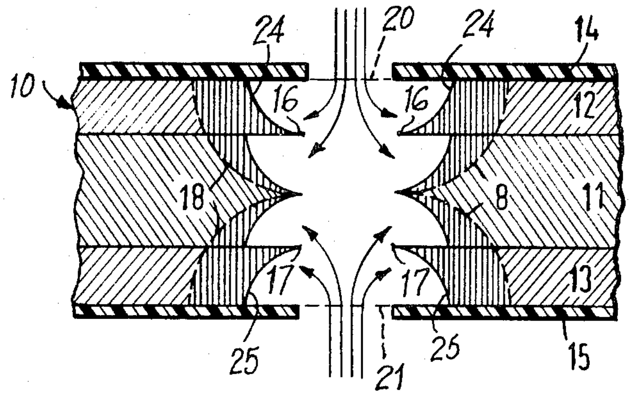
FIG. 1 is a greatly enlarged schematic representation of an area of the foil having an etching mask on portions of the opposite surfaces with the uncovered portions illustrating the difference between the etching according to the present invention and according to the prior art; and, FIG. 2 is an enlarged schematic illustration of a view similar to FIG. 1 showing an optimum edge configuration contemplated by the invention herein.

Referring to FIG. 1 there may be seen a greatly enlarged portion of a metal foil generally indicated at 10 having several discrete layers of material 11, 12 and 13 each of which has different characteristics when exposed to an etching agent. The inner core layer 11 consists of a metal such as copper-beryllium wherein the beryllium is present in the amount of about two percent. The core layer 11 may have a thickness of approximately 20 μm. (microns).

Additional layers of metal 12, 13 may be applied to one or both surfaces of the core 11. These additional layers 12, 13 may comprise copper of a thickness of about 20 μm. The resistance to etching of the material of the additional layers 12, 13 is greater than that of the core material 11 so that the core 11 will be etched faster than the outer layers 12, 13. It will be understood that further layers, not shown, may be arranged between the core 11 and the additional layers 12, 13 with each of the further layers having a resistance to etching which is intermediate the resistance to etching of the core 11 and the additional layers 12, 13. While I have illustrated a foil generally symmetrical about a centerline and which is subject to attack by an etching agent from opposite sides, my invention contemplates a foil construction equal to that on one side of the centerline and subject to attack by an etching agent from only one side.

A photolacquer which is well known in the art is applied on the outer surfaces of the foil such as illustrated at 14 and 15 after the foil surfaces have been cleaned on both sides. The photolacquer layers 14 and 15 on both sides are then exposed by means of glass photomasks to light. The exposed photolacquer layers are developed thereby baring the portions of the surface of the metal foil which is to be etched. Other equivalent processes producing similar results are contemplated by the invention herein. The important result of the application of the etching mask is that the mask outlines the configuration desired. It is an important object of this invention that the outline configuration be accurately duplicated in the foil to which it is applied.

An etching agent such as chromium-sulfuric acid, is applied to the exposed portions represented at 20, 21 and attacks the foil from the direction as illustrated by the arrows. Where the foil 10 consists of a homogeneous metal having a homogeneous resistance to etching as is known in the prior art, the etching agent will attack the metal to produce a cut schematically outlined at 18. From this it may be seen that the etching masks 14, 15 are considerably undercut.

By contrast according to the present invention in the embodiment illustrated in FIG. 1, the applicatio of the etching agent to the exposed portions 20, 21 brings it into contact with the layers 12, 13 having a relatively higher resistance to etching than the layer 11. As a result the layers 12, 13 will be etched until they reach a point illustrated by the outline 24, 25 at which time the core layer 11 of lesser resistance to etching will be exposed to the action of the etching agent. From this point further attack of the etching agent is effected essentially only in the copper-beryllium layer 11 until that has been etched through. Because of the higher etching speed of the layer 11 as contrasted with the layers 12, 13 an undercutting of the layers 12 and 13 will occur to leave edges represented at 16 and 17 in the area of transistion of the superimposed layers 11, 12, 13. From this it may be seen that the undercutting of the etching masks 14, 15 is not essentially greater than that which would have occurred in the prior art with a foil thickness half of less then half as great. If the thickness of the foil 10 were 40 μm. with the core 11 being 20 μm. and each of the layers 12, 13 being 10 μm it may be seen that the etching is not greater than would have occurred in a foil according to the prior art which was 20 μm. thick. Said another way it may be seen that the undercutting represented by the lines 24, 25 of the present invention is, in this example only about half as great as the undercutting represented by the lines 18 of the prior art. FIG. 1 illustrates the basic principles of the invention and will be understood that this invention contemplates any number of layers having resistances to etching graduating from high to low in proportion to their distance from the surface of the foil. The thickness of the individual layers should be in the same order of magnitudes and should differ only from each other by a factor of five at the very most. As previously stated the thickness of the core layer in FIG. 1 is about double that of the remaining layers.

Figure 2:
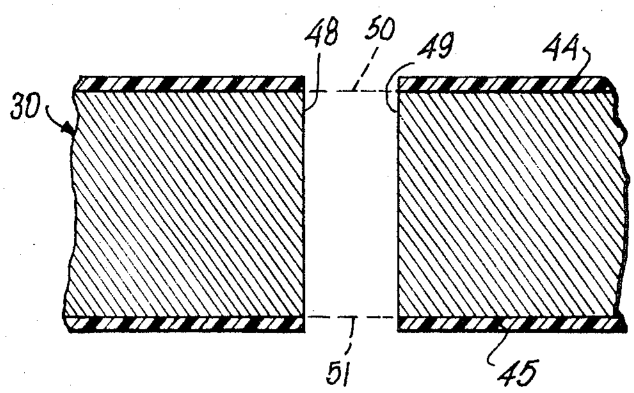

From the embodiment illustrated in FIG. 1 it may be seen that when metal foils are applied which consists of discrete layers of different compositions and different etching behaviors, it is possible that unevenesses may occur at the points of demarcation between the adjacent layers due to the discontinuous transition between the resistances of the various layers. Where this condition is not desirable it is contempelated by the invention herein that the metal foil may consist of a material wherein the decrease in etching resistance is inversely proportional to the effect of the etching agent on the metal so that under optimum conditions as shown in FIG. 2 the etching will produce straight edges 48, 49 even with the edges of the exposed portions 50, 51 in the etching mask 44, 45 on the foil generally indicated at 30. With reference to FIG. 1 it may be said that the hardness or resistance to the etching agent of the foil 30 may be inversely proportional to the curve indicated by the line 18. That is, the closer the metal exposed to the etching agent is to the surface being acted on by the etching agent, the more resistant to etching the material will be. This curve may be approximated with a series of thin discrete layers. It may also be approximated by constructing the metal foil of a series of discrete layers of material having the desired resistance to etching and then subjecting these layers to a high temperature diffusion process whereby the lines of demarcation between the layers are diffused so that the resistance to etching of the foil has a smooth continuity of variation over its depth in accordance with the optimum range of resistance.

Applying the diffusion process to the laminated foil of FIG. 1 it is necessary to heat the foil 10 to a temperature of approximately 800° to cause a diffusion between the metal of layers 11, 12 and 13. As a result of the diffusion a smooth transition will occur between the superimposed layers 11, 12 and 13. Application of the etching agent to this diffused sample will more nearly approximate the desired etch condition shown in FIG. 2.

In addition to the heretofor illustrated methods of obtaining more exact etch correspondence I have found that the effectiveness of the etching agent in attacking the metal foil in the direction vertical to the foil surface may be strengthened and enhanced by charging the metal foil with a direct current so that it acts as a cathode with the etching agent. The greater the speed of etching in this vertical direction the less undercutting which will occur and hence the straighter the edge and the more accurately it will conform to the pattern of the etching mask. This vertical etching speed may also be accelerated by forcing the etching agent against the exposed areas as, for example, by means of a power spray. This will tend to wash out the exposed areas with less undercutting.

It is also contemplated by my invention that the etching speed or effectiveness of the etching agent against the metal, can also be amplified or caused to a greater extent by local cell formation. The effect of the local cell may be prolonged by the cathodic switching of the metal foil, and thus an even stronger vertical etching attack may be obtained. In this differential etching it is the object to increase vertical attack and minimize horizontal etching effect.

From the above noted disclosure of the invention it may be seen that the disadvantages of the prior art are overcome by my invention which produces an edge more exactly conforming to the outlines of an etching mask.

Although minor modifications might be suggested by those versed in the art, it should be understood that I wish to embody within the scope of the patent warranted hereon all such modifications as reasonably and properly come within the scope of my contribution to the art.

I claim:

1. A method of minimizing undercutting during etching of metallic foils which comprises providing a metallic foil core of copper-beryllium having a copper foil layer thereon which has a greater resistance to etching than said core, said foil layer and said core having thicknesses which differ by not more than a factor of five, applying an etching mask to said foil layer, and applying an etching agent to said foil layer through said etching mask to etch through the combined layers.

2. The method in accordance with claim 1 which includes foil layers on opposite surfaces of the cores.

3. A method according to claim 1 wherein the core is about twice as thick as each of the additional layers.

4. A method according to claim 1 wherein said foil is provided in a series of discrete layers of metal having said plurality of layers being subjected to a high temperature diffusion whereby said resistance to etching of said foil has a smooth continuity of variation over its depth.

5. A method according to claim 1 wherein said metal foil is charged by direct current so that it acts as a cathode.

6. A method according to claim 1 wherein the etching agent is applied in a spray.

7. A method according to claim 1 wherein further layers are arranged between said core and said additional layers, said further layers having a resistance to etching which is intermediate said first and second resistances.

References Cited

UNITED STATES PATENTS

| | | | |
|---|---|---|---|
| 2,731,333 | 1/1956 | Ko et al. | 156—11 |
| 3,210,226 | 10/1965 | Young | 156—11 X |
| 3,287,191 | 11/1966 | Borth | 156—3 |

JACOB H. STEINBERG, Primary Examiner

U.S. Cl. X.R.

156—3; 204—143